United States Patent [19]

Tomaszewski

[11] Patent Number: 4,768,693

[45] Date of Patent: Sep. 6, 1988

[54] CANISTER OPENER

[76] Inventor: James E. Tomaszewski, 813 Floyd Ave., Rome, N.Y. 13440-4456

[21] Appl. No.: 913,034

[22] Filed: Sep. 29, 1986

[51] Int. Cl.⁴ .............................................. B26F 3/00
[52] U.S. Cl. .................................. 225/94; 30/120.3; 30/363
[58] Field of Search .............................. 225/94, 1, 93; 30/120.3, 363; 100/233, 902; 29/426.4, 426.5; 414/412; 83/586

[56] References Cited

U.S. PATENT DOCUMENTS

| | | | |
|---|---|---|---|
| 917,739 | 4/1909 | Owens | 83/586 |
| 1,450,795 | 4/1923 | Dohe | 30/363 X |
| 1,705,950 | 3/1929 | Wright | |
| 3,298,100 | 1/1967 | Walker et al. | 30/16 |
| 3,487,525 | 1/1970 | Patay | 29/426.4 X |
| 3,487,965 | 1/1970 | Gale | 414/412 X |
| 3,776,129 | 12/1973 | Carlson | 100/98 R |
| 3,800,419 | 4/1974 | Hughes, Jr. | 30/358 |
| 4,009,651 | 3/1977 | Adams | 30/120.3 X |
| 4,110,885 | 9/1978 | Fisher | 29/426.4 X |
| 4,128,938 | 12/1978 | Davis | 30/120.3 |
| 4,442,768 | 4/1984 | Bailey | 100/233 |
| 4,554,737 | 11/1985 | Bartels | 30/120.3 |

Primary Examiner—Frank T. Yost
Attorney, Agent, or Firm—Jack M. Young; Donald J. Singer

[57] ABSTRACT

A hand-operated canister opener tool, and method, for opening a frangible, plastic-walled, hollow canister (such as one containing a cryptographic, secret, military code) having two pivotally connected elements carrying a canister piercing member for piercing the canister to examine its contents before discard, and a canister receiving member surrounding the canister for safety during piercing for preventing ejection of shrapnel-like, sharp, plastic chips likely to cause bodily injury.

6 Claims, 3 Drawing Sheets

CANISTER OPENER

STATEMENT OF GOVERNMENT INTEREST

The invention described herein may be manufactured and used by or for the Government for governmental purposes without the payment of any royalty thereon.

BACKGROUND OF THE INVENTION

The field of the invention is to a tool, and method, for opening, piercing or crushing a hollow plastic canister or container, such as a key, paper tape canister 20 of the type shown in FIGS. 6–6B of the attached drawings containing secret code, cryptographic on tape 12 dispensed one day at a time to disclose a secret code for use by United States Armed forces with each COMSEC unit thereof having the duty under rules of strictest military secrecy to safeguard these canisters, to distribute them only to the few personnel authorized to use them in that military unit, to account for the whereabouts of all distributed canisters at all times, to retrieve spent canisters for destruction under strictest secrecy, to pierce these spent canisters, and then to be sure no secret code containing tape in any of them is inadvertently discarded.

Prior to the present invention, this task was both tedious and dangerous. The prescribed method involved enclosing canister 20 in a plastic bag, piercing each side of the plastic canister with a screwdriver, and opening the canister with a blow of a sledgehammer. Sharp pieces of plastic debree easily pierced the plastic bag, endangered all personnel thereabouts by the shrapnel-like explosion of the sharp plastic pieces, and required extensive work to clean up.

SUMMARY OF THE INVENTION

One object of the present invention is to provide a safe, efficient tool and/or method for piercing and disposing in a military secure manner a cryptographic, key tape canister containing, and dispensing periodically, secret code containing paper tape. It is necessary, and desireable for military security reasons, to open up each canister before discard and inspect its interior to be sure no secret tape is inadvertently thrown away with the spent canister.

A further object of the present invention is to provide a tool and/or method confining sharp plastic fragments, otherwise ejected like shrapnel, which threatened bodily harm to any nearby personnel.

A further object of the present invention is to provide a tool and/or method for opening canisters characterized by inexpensive costs of manufacture and operation, ease of assembly and manufacture of its component parts, structural simplicity, many desireable operating and use features, multiplicity of functional advantages for some of its component structural parts and method steps, attractive exterior appearance, safe operating characteristics, and long wearlife.

These and other objects, novel features and additional advantages of the present invention will become more clearly apparent by reference to the appended claims as the following detailed description and discussion proceeds in conjunction with the accompanying drawings, wherein like elements are given like reference numerals throughout.

DESCRIPTION OF THE PREFERRED EMBODIMENT(S)

Figure 5:
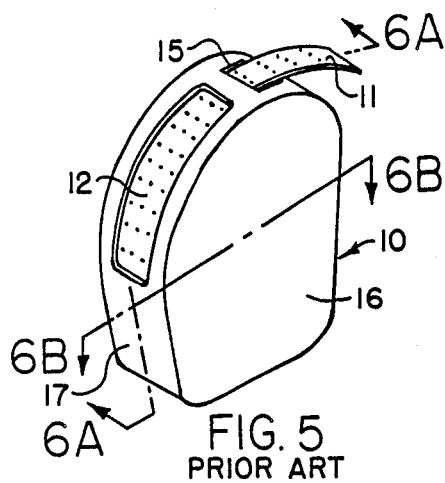
FIG. 5 is a perspective view of the canister to be opened by the opener of the present invention.
Figure 6A:
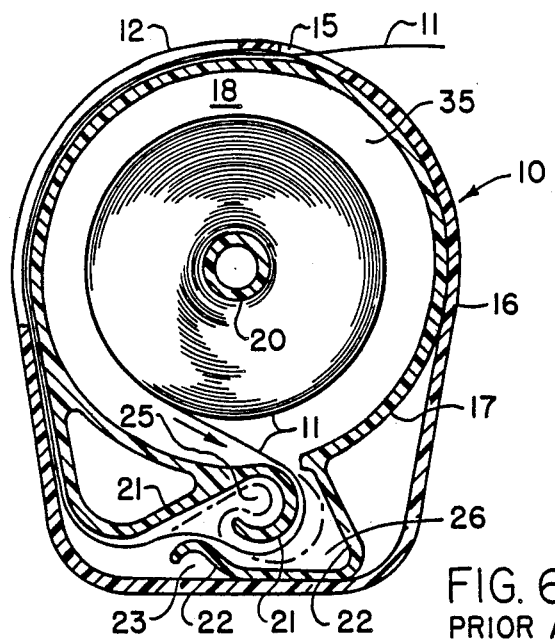
FIG. 6A is a sectional view of the canister in FIG. 5 taken generally along line 6A—6A of FIG. 5.
Figure 6B:
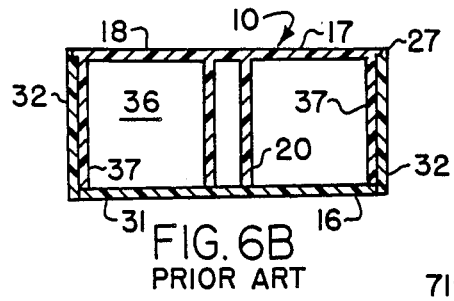
FIG. 6B is a sectional view of the canister in FIG. 5 taken generally along line 6B—6B of FIG. 5.

Canister 10 to be opened: (1) is more fully disclosed in U.S. Pat. No. 4,108,390 (hereinafter Patent '390) granted Aug. 22, 1978 on PAPER TAPE CANISTER to H.V. Hayes; (2) is shown in FIGS. 5, 6A, and 6B of the drawings herein disclosing from Patent '390 paper tape canister 10, paper tape 11, and correspondingly numbered other components 12–35 in patent '390; (3) is a frangible, plastic-walled, paper tape, canister 20 containing secret cryptographic tape 11 in compartment 35. A portion of tape 11, having thereon secret code only usable for that, and no other, calendar day can be manually dispensed from the paper tape roll supply in FIG. 6A on fixed spindle 20 in compartment 36 through opening 15, but cannot be reinserted into canister 10 after once removed.

Before discarding and/or destroying any used canister 10, the user must be sure that no secret tape remains in compartment 36. But note that tape 11 is not inspectable or accessible inside compartment 36 from outside canister 10 until after canister 10 has been pierced or broken substantially.

The present invention is directed toward: (1) hand operable tool type, canister opener 40 in drawing FIGS. 1–4 and 7–12, inclusive, and (2) the method, for opening canister 20, and inspecting compartment 36 for any secret tape 11 remaining therein before discarding used canister 10. The canister opening taking place in a safe manner by preventing expelling dangerous, flying, shrapnel like, sharp, plastic chips threatening bodily injury to anyone close by.

Canister opener 40 has many of its component parts made of hard wood, but these parts can be made of any suitable material.

Figure 1:
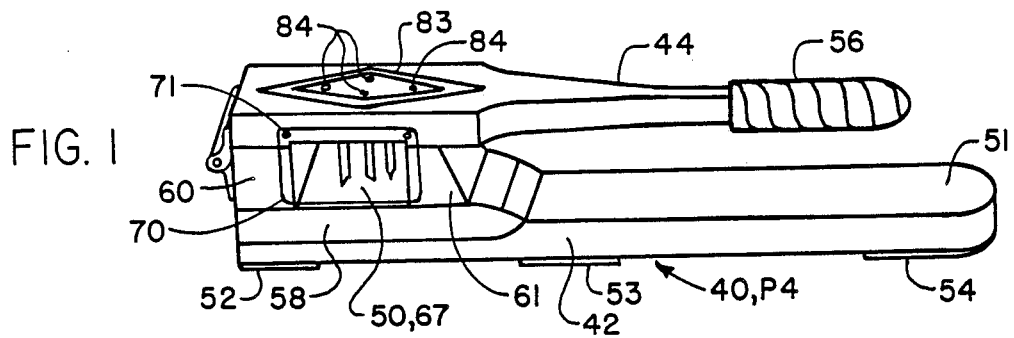
FIG. 1 is a perspective, partially side view, of the canister opener in the canister opened position.
Figure 2:
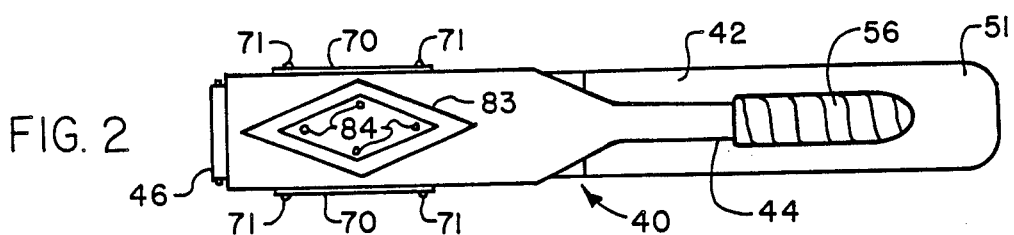
FIG. 2 is a top view of the opener in FIG. 1.
Figure 3:
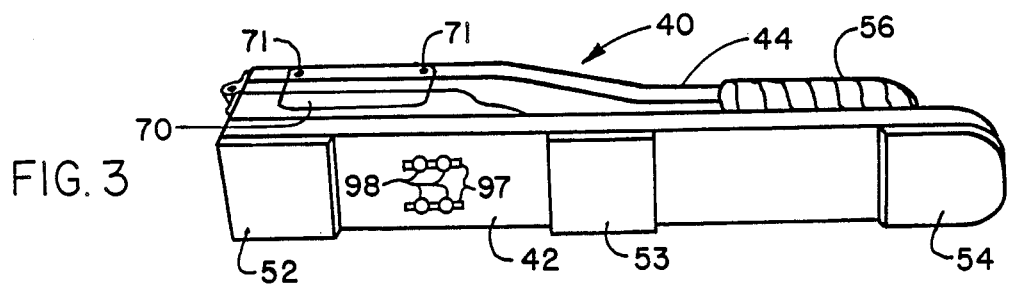
FIG. 3 is a perspective, partially bottom, view of the opener in FIG. 1.
Figure 7:
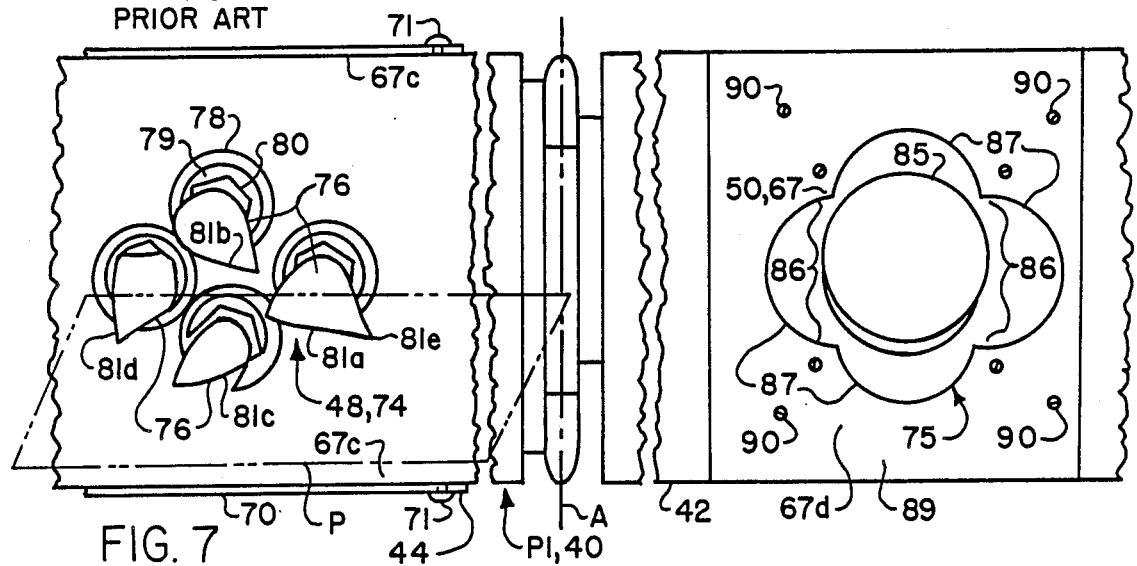
FIG. 7 is a perspective view of the punch parts or piercing member, and coacting die parts, of the canister opener in FIG. 1 in its fully opened position.
Figure 8:
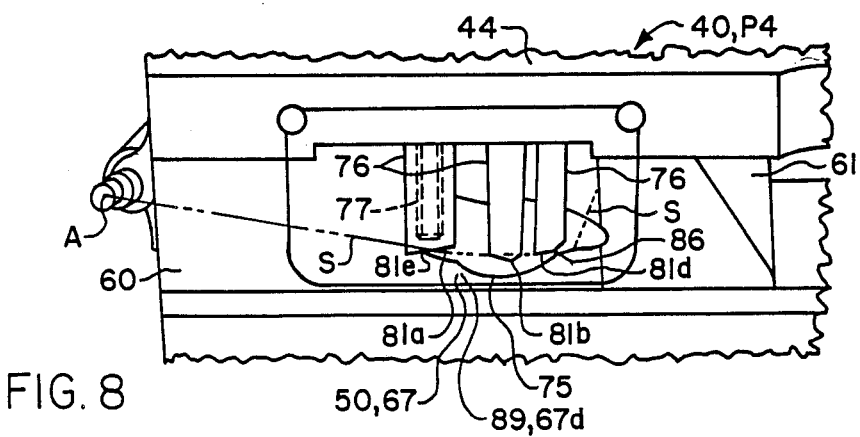
FIG. 8 is an enlarged, perspective view of the piercing member, and associated structure, of the canister in FIG. 1 canister opened position.
Figure 9:
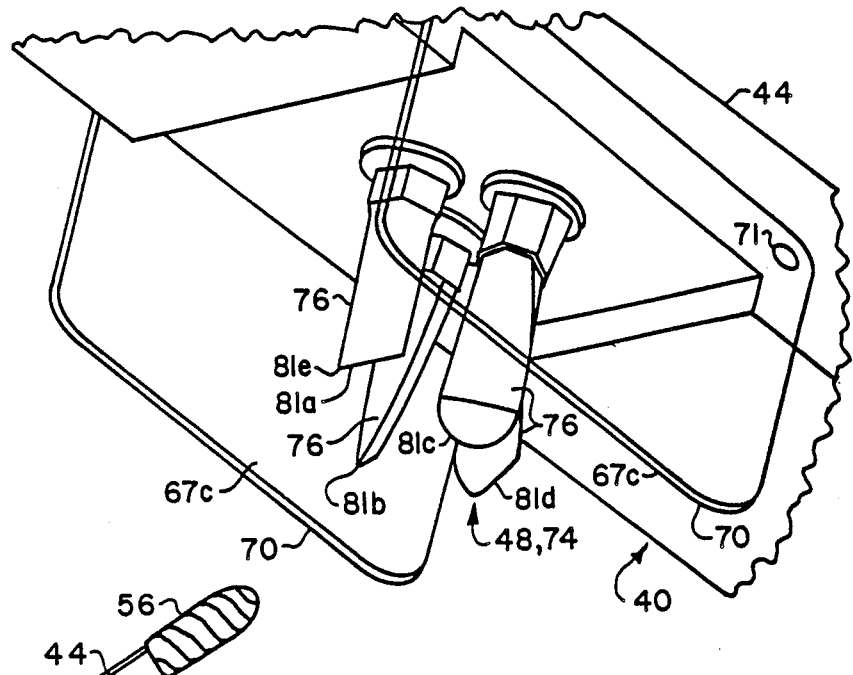
FIG. 9 is a perspective view of the piercing member, and associated structure, in the canister loading position in FIG. 10.
Figure 10:
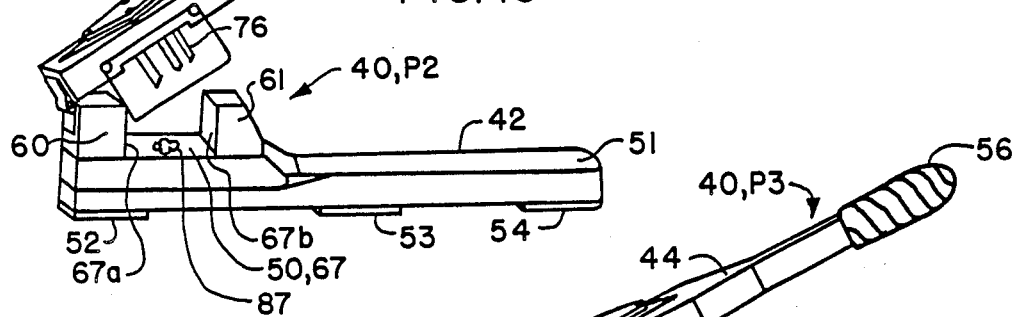
FIG. 10 is a perspective, partially side view of the canister opener in FIG. 1 in the canister loading position.
Figure 11:
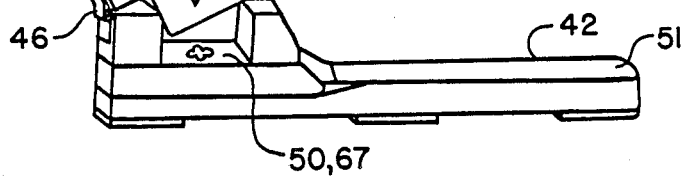
FIG. 11 is a perspective, partially side, view of the canister in FIG. 1 in the canister loaded position.
Figure 12:
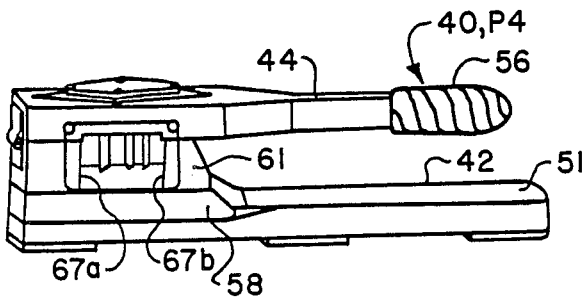
FIG. 12 is a perspective, partially side, view of the canister opener in FIG. 1 canister opened position.

Canister opener 40 has base or first element 42; handle or second element 44; and hinge 46 operatively connecting these elements for pivotable relative movement approximately 180° about pivot axis A between the fully opened position P1 in FIG. 7, canister loading position P2 in FIG. 10, canister loaded position P3 in FIG. 11, and canister opened (or pierced) position P4 in FIGS. 1 and 12. Hinge 46 has its hinge leaves 47, 49 secured by screws to corresponding ends of elements 42, 44, respectively. Other type hinge means may be substituted, if desired, such as a hinge having a connecting link having on its ends parallel axes for permitting opener 40 to pierce canisters 10 of a large range of sizes as to thickness.

Opener 40 includes: (1) canister piercing member 48 on element 44 for piercing canister 10 in canister opened position in FIGS. 1 and 12, and (2) canister receiving member 50, primarily on base element 42, for aligning canister 10 for piercing by piercing member 48 during travel of elements 40, 42 from canister loading position P2 in FIG. 10 through canister loaded position P3 in FIG. 11 into canister opened position P4 in FIGS. 1 and 12.

Canister 20 is very solidly built to prevent unauthorized entry and to permit rough handling without breakage during use. In FIG. 6B, platform walls 18 and 31 are rigidly connected by vertically extending spindle 20, walls 32 and 37, and partitions 21 and 22, each of which extend and bridge the full distance between platform walls 18 and 31, and is either integral therewith or epoxy glued or ultrasonic welded thereto, to form a very rigid, box-beam like construction, resisting piercing by canister opener 40 of the present invention.

Opener 40, as a hand operable tool, has three features to help provide the considerable leverage and force required to pierce canister 20. First, Base element 42 is longer than handle 44 to provide at its distal end a hand hold portion 51 during actuation of handle 44 to assure stability of tool 40 during usage. Second, three, non-slip pads 52, 53 and 54 are secured to the bottom of base 42 in FIG. 3. Third, non-slip wrap 56 in FIGS. 1–3 and 10–12 is wrapped around handle 44 near its distal end portion for providing a non-slip had grip on handle 44, similar to a tennis racket handle wrap, since wood tends to get slippery from hand sweat during use, and providing protection against slivers from the wood. Canister receiving member 50 is formed by portions on base 42 and handle 44. Base 42 has separate base 58 and end blocks 60 and 61 on base 42 forming canister socket, pocket or chamber 67 for receiving canister 10. Handle 44 has two parallel, transparent, plexiglass, chip deflectors 70 secured to the sides of handle 44 by screws 71. As handle 44 moved from position P2 in FIG. 10 to position P4 in FIGS. 1 and 12, two chip deflectors 70 are lowered by handle 44 into the position shown in FIGS. 1, 8 and 12 to straddle closely separate base 58 and base element 42, since base 58 and elements 42, 44 are about the same width, and to straddle canister 10, socket 67 and the rest of canister receiving member 50 carried by base 42.

Socket 67 is generally of the same shape as, and closely fits, canister 20 by encircling and laterally supporting canister 20 by the surfaces or wall portions of socket 67. These take the form of socket wall portion 67a on end block 60 and socket wall portions 67b on end block 61 (each of which extends through a plane through pivot axis A), and socket wall portions 67c on the inner faces of chip deflectors 70. Transparency of deflectors 70 permits observing canister piercing action in position P4 in FIGS. 1 and 12. Encircling wall portions 67a, 67b and 67c prevent expelling sharp plastic chips from pierced canister 20 when handle 44 is moved toward, and into canister opened position P4 in FIGS. 1 and 12, so that no flying, shrapnel like, plastic chips threaten bodily injury to the user.

In FIGS. 1 and 7–12, canister 10 is pierced by canister piercing member 48 formed by punch part 74 on handle element 44 for piercing canister 10 in canister opened position P4. Telescoping, coacting, punch part 74 and die part 75 are respectfully formed by canister piercing member 48 and bottom socket wall portion 67d of canister receiving member 50.

Punch part 74 includes four parallel tines 76 spaced apart to define in transverse section the respective four corners of a parallelgram 73 in FIG. 7. Each tine 76 includes headed bolt 77, having its head recessed in a counter bore in the top of lever element 44, having its threaded shank telescoped through a hole in lever 44, washer 78 and stainless steel sleeve 80, and having its threaded nut 79 pulling washer 78 and bolt 77 tightly against lever 44 so bolt 77 cannot rotate. Steel sleeve 80 is swaged, or cold forged, to squeeze sleeve 80 onto the threaded shank of bolt 77. Triangular-shaped cover 83 is secured by four screws 84 to the top of lever 44 to cover the recessed heads of four bolts 77. Four tines 76 have lower or distal ends of their steel sleeves 80 flattened and sharpened as piercing ends 81a, 81b, 81c and 81d respectively for first, second, third and fourth tines 76. Sharpening can be by trimming, filing, grinding, or otherwise shaping ends of sleeves 80.

Die part 75 has hole 85, aligned with punch part 74 and extending either partially or completely through base 42, for receiving the pierced, sheared plastic scrap of canister 10; has four, inwardly extending, shoulders 86; and has four, cloverleaf shaped, tine clearance holes 87 alternately spaced around the outline of the wall of canister 10 to be sheared or pierced by canister piercing member 48 during relative movement of elements 42, 44 from canister loaded to opened positions P3 and P4, respectively. Four tine clearances holes 87 telescopically receive, four respective tines 76 during travel to position P4 while canister 10 rests on four inwardly extending shoulders 86.

Metal plate 89, such as an aluminum plate, is secured by four screws 90 to wooden base 42 to provide a metallic surface for co-acting with canister 10 during relative movement of punch and die parts 74, 75 toward canister opened position P4. Plate 89: (1) provides a metallic bearing surface for permitting relative movement of canister 10 relative to canister receiving member bottom socket wall or die part surface 67d, and (2) prevents sharp, frangible, plastic chips from pierced canister 10 from piercing this surface 67d to shorten its wear life.

Scrap well 85 is preferably made deep enough, at least one-half inch deep, so that piercing member 48 tines 76 pierce both upper and lower canister platform walls 18, 31 in FIG. 6B in a single piercing stroke and so that scrap hole 85 is deep enough to receive scrap from several pierced canisters 10 without plastic scrap interfering with proper seating of next canister 10 on die part shoulders 86 for a good piercing action, and to not require emptying plastic scrap from scrap hole 85 before several canisters 10 have been pierced. Scrap hole 85 is preferably a through hole in base 42 so that pierced scrap will fall through hole 85, and not accummulate therein, to avoid all of these problems and to permit continuous canister 10 piercing by tool 40.

Punch and die parts 74, 75 provide a superior piercing action by the specifically disclosed tines 76-by their number, shape, and orientation, and by the relation between their flattened and sharpened piercing ends 81a, 81b, 81c and 81d. Also, the required manually exerted force on handle 44 is reduced by piercing or shearing progressively, instead of piercing the entire hole in canister 10 at one time. This is true for the following numbered reasons.

First, four tines 76 are spaced from and oriented relative to pivot axis A as: (1) first tine flattened end 67a in geometric imaginary plane Pl in FIG. 7, which plane P extends generally perpendicularly to hinge pivot axis A and through piercing midpoint 92 on canister 10; (2) second and third tines sharpened, flattened ends 81b, 81c located approximately equidistant from and straddling plane P, diverging away from first tine end 81a, and located farther from hinge pivot axis A than first tine end 81a; and (3) fourth tine sharpened, fluttened end 81d extending approximately perpendicular to, through, and bisected by plane P.

Second, geometric, generated, imaginary surface S of canister 10 piercing action is formed and generated by moving a straight line, remaining parallel to hinge pivot axis A, and extending through flattened and sharpened tine ends 67a, 67b, 67c and 67d.

Third, the: (1) flattened, sharpened ends 81a of first tine 76 closest to hinge pivot axis A has its leading sharp corner 81e extending through generated surface S for first piercing a hole in canister 10 outer, top wall 18 in FIG. 6B, so that continuing movement toward position P4 in FIGS. 1 and 12 will cause first tine piercing end 81a, and its associated tine, to continue thereafter to open this hole; (2) diverging, flattened and sharpened ends 81b and 81c of second and third tines 76 pierce wall 18 and laterally enlarged this hole; (3) flattened, sharpened end 81d of (3) flattened, fourth tine 86 pierces wall 18 and cuts completely across the rear edge of the enlarged hole in canister wall 18.

A similar piercing, and progressively piercing or shearing action, is caused by the tine piercing ends piercing bottom canister wall 31 in FIG. 6B after traveling through canister compartment 36.

Hence, a hole is pierced, and progressively enlarged successively in canister walls 18 and 31 during relative movement of tool elements 42, 44 from canister loaded position P3 to canister opened position P4 in FIGS. 11 and 12, respectively.

The smooth exterior surfaces of steel sleeve 80, above their lower piercing ends, help cause the piercing and hole enlarging action during piercing of canister 10. An unsatisfactory piercing or shearing action was obtained (1) when sleeves 80 were eliminated, since threads on bolts 77 resisted piercing plastic walls 18, 31 during piercing action towards position P4 in FIGS. 1 and 12 and prevented, like a barbed arrow, tines 76 being pulled out of the pierced plastic when the tool was tried to be moved from positions P4 to P3 in FIGS. 12 and 11, respectively, (2) when the lower ends of bolts 77 did not have sharpened, piercing ends; and (3) when less than four tines 76 were used, so that the smooth, progressive piercing action above described did not occur in the generated surface S of canister piercing action.

Figure 4:
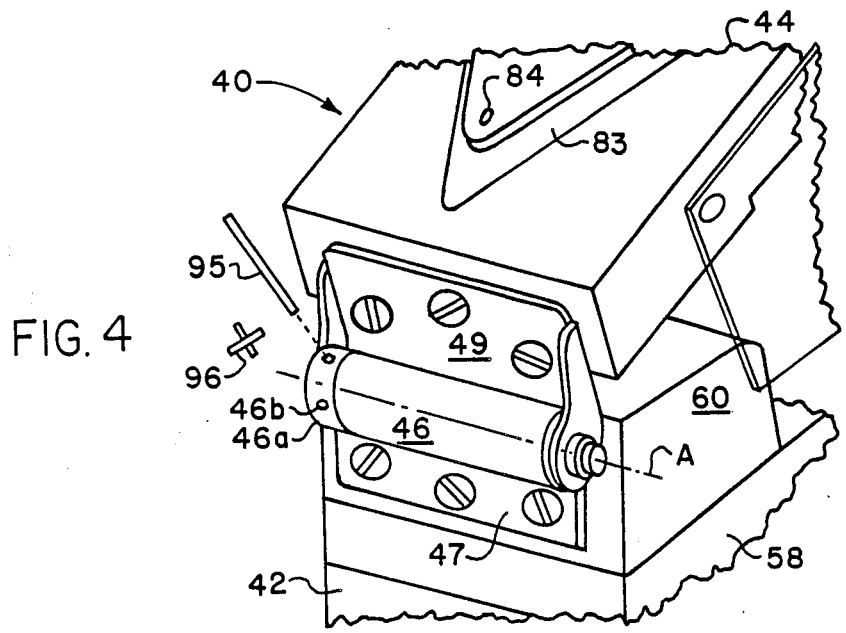
FIG. 4 is a perspective, left end view of the top and hinged the opener in FIG. 1.

Canister opener 30 has several desireable and/or adjustment features. First, hinge 46 is a conventional adjustable spring hinge resiliently biasing elements 42, 44 from canister loading position Pl toward canister opened position P4 and normally into canister loaded position P3 in FIG. 11, wherein canister piercing member 48 engages canister 10 to retain it in canister receiving member 50 and to enclose piercing ends 81a, 81b, 81c and 81d at least partially embedded in top wall 18 of canister 10 and surrounded by chip deflectors 70 to prevent injury to user of tool 40. Second, the amount of resilient bias of hinge 40 is adjustable for obtaining the optimum resilient bias toward canister opened position P4. Torsion collar 46a is secured pivotally on the hinge pintel or pivot shaft and to one end of the torsion spring in hinge 46, so that steel rod 95 can be inserted selectively into any hole 46b on collar 46a for tightening the tension. Then, stop pin 96 can be inserted into a selective hole in collar 46a and bear against one of the hinge leaves, as shown in FIG. 4, for preventing spring tension unwinding. Third, tool 40 is adjustable to receive and pierce canisters 10 with different lateral dimensions. End block 61 can either be secured to, or be adjustable relative to, base 58. If adjustable, two parallel slots 97 in bases 42, 58 slidably receive four headed bolts 98, each screwed into a threaded hole in block 61, so its socket wall portion 67b is moveable, relative to base 42 and clamped by tightening bolts 98 in any selected distance from pivot axis A with the adjustment action provided by slots 97 and bolts 98 operatively connecting socket wall portion 67b to lever 42 most remote from pivot axis A for movement relative to base 42 towards and away from pivot axis A.

If desired, end block 60, instead of 61, may be similarly made adjustable, as described above.

Here is the mode of operation of canister opener or hand operable tool 40, and method steps, for: (1) piercing spent cryptographic paper tape canisters 10 by applying minimum force by utilizing progressive piercing and shearing with safety without fear of flying, shrapnel-like, sharp, plastic pieces and; (2) insuring against breach of cryptographic security regulations by carefully inspecting and removing any cryptographic tape 12 remaining in spent canister 10 before discarding canister 10. First, tool 40 user inserts spent canister 10 in FIG. 10 canister loading position P2 and then releases handle 44 permitting handle 44 to drop into FIG. 11 canister loaded position. Canister 10 is inserted between the relatively rigid wall portions surrounding socket 67, formed by socket wall bottom portion 67d on die part 75, and lateral support socket wall portions 67a on block 60, 67b on block 61, and 67c on the inner faces of two chip deflectors 70 closely straddling canister 10 as tool lever 44 is released to move downwardly from FIG. 11 to 12 positions. These relatively rigid wall portions, forming socket 67 surrounding canister 10, prevent expelling plastic chips during piercing canisters 10. If hand operated lever 44 is released, tool 40 may be safely left in canister loaded position P3 in FIG. 11 since some sharp piercing tines 76 are partially embedded in plastic canister 10, shielded by straddling chip deflectors 70 and by bottom surface of lever 44 above canister 10, and handle 44 is biased by spring hinge 46 to remain in position P3 for safety. Second, tool 40 user brings handle 44 brings down smartly to pierce canister 10 by tines 70 piercing at least top canister wall 18 in FIG. 6B, and preferrably both top and bottom outer walls 18 and 31, with tines 70 designed to enter the annualar compartment 36 around spindle 20 in FIGS. 6A-6B, the weakest part of canister 10, to cause spindle 20, and the portions of top and bottom walls 18 and 31 encircled by tines 76, to be punched from the rest of canister 10 and to be carried downwardly by the tine piercing action, and probably crushed into hole 85, leaving the donut-shaped remains of canister 10 in socket 67 surrounding tines 76 in position P4. Canister 10 straddling chip deflectors 70 surrounding and captures any flying plastic fragments to prevent bodily injury from any shrapnel-like flying fragments. Third, donut-shaped canister 10 remaining in socket 67 is removed after raising handle 44 to canister loading position P2 in FIG. 10, and the next canister can be inserted for repeat of the piercing operation. Fourth, tool 40 user inspects within opened compartment 36 for any secret tape remaining therein, and removes any such tape found therein before discarding opened, spent canister 10.

Whenever an unreasonable amount of scrap debree accumulates in scrap hole 85, tool 40 (in position P2) can be tilted to expell the scrap debree. If the required number of canisters 10 have been pierced in this matter, the user can inspect within open compartments 36, and among the debree, for any tape 11 containing secret codes before discarding all opened canisters 10 and plastic debree to prevent inadvertently discarding any of the secret code containing tape 11. If scrap hole 85 is too shallow and resists simultaneous by piercing top and bottom walls 18 and 31, whether by build up of scrap 83 in scrap hole 85 or because scrap hole 85 was originally made too shallow, it may be necessary to flip over canister 21 in socket 67 in tool position P2 and then repeat the piercing action with canister wall 31 on top for first piercing by tines 76. Making scrap hole 85 a through hole in base 42 eliminates this second piercing operation since no scrap can accummulate therein. In any event, the scrap debree can be timely discarded and canister piercing and/or crushing does not create flying debree.

The invention may be embodied in other specific forms without departing from the spirit or essential charateristics thereof. It is understood that: the present embodiment(s) are therefore to be considered in all respects as illustrative and not restrictive the words which have been used are words of description rather than words of limitation, the scope of the invention is indicated by the appended claim(s) rather than by the foregoing description, and all changes which come within the meaning and range of equivalency of the claim(s) are therefore intended to be embraced therein.

What is claimed is:

1. A canister opener for opening a frangible, plastic-walled, hollow canister, comprising
    a first element,
    a second element,
    hinge means operatively connecting said elements for pivotal relative movement between a canister loading position and a canister opened position,
    a canister piercing member on one of said elements for piercing said canister in said canister opened position,
    a canister receiving member on at least the other of said elements for aligning said canister for piercing by said canister piercing member during element travel from said canister loading to opened positions,
    said canister receiving member having wall portions surrounding said canister on all sides during movement of said elements toward said canister opened position for prevention expelling of frangible plastic chips from the pierced canister, and further including a telescoping, coacting, punch part and die part respectively formed by said canister piercing member and the bottom wall portion of said canister receiving member, and
    wherein said die and punch parts, respectively include shoulder and tines alternately spaced around the outline of the wall of said canister to be sheared from said canister by said canister piercing member during relative movement of the elements to said canister opened position.

2. The canister opener of claim 1 wherein said die part includes tine clearance holes for telescopically receiving the respective tines during travel to said canister opened position.

3. The canister opener of claim 1, wherein said tines include four parallel tines spaced apart to define in transverse cross-section the respective four corners of a parallelogram.

4. The canister opener of claim 3 wherein at least some of said tines are tubular, and have a flattened and sharpened piercing end.

5. The canister opener of claim 3, wherein said hinge means includes a pivot axis around which pivotal relative element movement occurs,
    the four tines being spaced from oriented relative to said pivot axis as,
    a first tine having its flattened end in a geometric imaginary plane extending generally perpendicularly to said pivot axis and through the piercing mid-point of the canister,
    second and third tines having their sharpened flattened ends approximately equidistant from and straddling said plane diverging away from said first tine's end and located farther from said pivot axis than the first tine, and
    a fourth tine having its sharpened, flattened end extending approximately perpendicular to and through said plane,
    a geometric generated, imaginary surface of canister piercing action generated by moving a straight line remaining parallel to said axis extending through the flattened, and sharpened tine ends,
    the flattened sharpened end(s) of the
        first tine closest to said pivot axis has its leading sharp corner extending through said generated surface for first piercing a hole in the canister outer wall so that the first tine continues thereafter to open this hole,
        diverging second and third tines laterally enlarging this hole, and said fourth tine cutting the rear edge of the enlarged hole,
    whereby a hole is pierced and progressively enlarged in the canister wall by the tines during relative movement of the elements to the canister opened position.

6. A canister opener for opening a frangible plastic-walled, hollow canister, comprising
    a first element,
    a second element,
    a hinge means operatively connecting said elements for pivotal relative movement between a canister loading position and a canister opened position,
    a canister piercing member on one of said elements for piercing said canister in said canister opened position,
    a canister receiving member on at least the other of said elements for aligning said canister for piercing by said canister piercing member during element travel from said canister loading to opened positions, said canister receiving member having wall portions surrounding said canister on all sides during movement of said elements toward said canister opened position for preventing expelling of frangible plastic chips from the pierced canister, said hinge means including a pivot axis around which pivotal relative element movement occurs, said canister receiving member including a socket for receiving said canister and having socket wall portions for laterally supporting the canister and extending through a plane through said pivot axis, adjustment means operatively connecting a socket wall portion to the second the element most remote from said pivot axis for movement relative to said other element toward and away from said pivot axis, and clamping means for clamping said last mentioned socket wall portion relative to said other element at selected distances from said pivot axis, whereby canisters of different lateral dimensions and sizes can be clamped in said socket for piercing and opening canisters of different sizes.

* * * * *